United States Patent Office

3,448,072
Patented June 3, 1969

3,448,072
SILYLURETHANE TERMINATED POLYESTER COMPOSITIONS
Bruce A. Ashby, Schenectady, N.Y., assignor to General Electric Company, a corporation of New York
No Drawing. Continuation-in-part of application Ser. No. 463,877, June 14, 1965. This application May 2, 1966, Ser. No. 546,550
Int. Cl. C08g 51/04, 31/00
U.S. Cl. 260—40                18 Claims

ABSTRACT OF THE DISCLOSURE

Curable compositions comprising a polyester having terminal silylurethane groups which have hydrolyzable radicals attached to silicon, and a method for making such curable compositions. A polyester and an isocyanate are initially contacted to provide for the introduction of aliphatic unsaturation into the polyester, which is thereafter contacted in the presence of a platinum catalyst with a silicon hydride having hydrolyzable radicals attached to silicon. The curable compositions are useful as sealants, encapsulants, caulking compounds, and other related uses.

---

This application is a continuation-in-part of my copending application Ser. No. 463,877 filed June 14, 1965, now Patent No. 3,408,321, and assigned to the same assignee as the present invention.

The present invention relates to room temperature curable compositions comprising a polyester having chemically combined organosilyl groups with hydrolyzable radicals attached to silicon.

Prior to the present invention various one package room temperature vulcanizing organopolysiloxane compositions, such as shown by Bruner Patent 3,032,532 were utilized in a variety of applications. Although cured products resulting from these compositions provide for the production of materials possessing many of the desirable characteristics of conventional organopolysiloxane elastomers, such as heat stability, low temperature flexibility, etc., these cured products often lack toughness, and resistance to the effects of organic solvents. Some product improvements have been achieved with room temperature vulcanizing materials in the form of isocyanate-terminated polymers as shown in British Patent 971,682. Experience has shown however, that isocyanate-terminated polymers can be highly toxic materials. Their relatively long tack-free time prior to cure has increased the risk of isocyanate poisoning which can be significant when isocyanate polymer is contacted with the skin. As a result, extreme care must be utilized in applications requiring the handling of these materials in the form of uncured shaped polymer sections.

The present invention is based on the discovery that certain polyesters having organosilyl groups with hydrolyzable radicals attached to silicon for example, acyloxy, ketoximato, halogen, amino, etc., provide for the production of room temperature curable compositions which are convertible to elastomeric products having valuable characteristics. These room temperature curable compositions can be readily shaped and have a relatively short tack-free time. The cured products also possess improved toughness and resistance to swell when contacted with various organic solvents.

Included by the room temperature curable compositions of the present invention are compositions comprising polyester consisting essentially of chemically combined units of the formula, (1)

having organosilyl groups consisting of (A), at least one monovalent silyl radical of the formula,

joined by a carbon-silicon bond to (B) an intermediate polyvalent organo radical selected from hydrocarbon radicals, halogenated hydrocarbon radicals, hydrocarbonoxy radicals and halogenated hydrocarbonoxy radicals, which is directly attached to said polyester by a linkage selected from carbonate, ester and urethane, where R is selected from divalent hydrocarbon radicals and halogenated divalent hydrocarbon radicals, R' is a member selected from monovalent hydrocarbon radicals and halogenated monovalent hydrocarbon radicals, Y is a hydrolyzable radical selected from acyloxy radicals, amino radicals, halogen radicals and ketoximato radicals, and $a$ is a whole number equal to 0 to 2, inclusive.

Preferably, the polyester utilized in the room temperature curable compositions of the invention is made by effecting reaction, in the presence of a platinum catalyst, between a silicon hydride of the formula, (2)

where R', Y and $a$ are as defined above, and an unsaturated polyester, consisting essentially of chemically combined units of Formula 1, having terminal aliphatically unsaturated radicals selected from

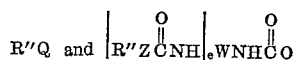

where R" is a monovalent radical containing aliphatic unsaturation selected from hydrocarbon radicals, and halogenated hydrocarbon radicals, such as an olefinically, or acetylenically unsaturated aliphatic, or cycloaliphatic radical, Q is a linkage such as

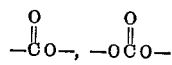

and

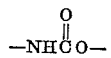

Z is selected from NG, O and S, G is selected from hydrogen and R' radicals, W is a polyvalent hydrocarbon radical, and $e$ has a value equal to 1 or 2 and 1 less than the value of W.

Radicals included by R, are for example, alkylene such as methylene, ethylene, propylene, butylene, pentylene, etc., haloalkylene, such as chloroethylene, chloropropylene, chloroisopropylene, chlorobutylene, etc., alkylenearylene, such as ethylenephenylene, etc.; arylene and haloarylene such as phenylene, naphthalene, chlorophenylene, etc. Radicals included by R' are for example, aryl radicals and halogenated aryl radicals, such as phenyl, chlorophenyl, naphthyl, etc., aralkyl radicals, such as benzyl, phenylethyl, etc.; aliphatic, haloaliphatic, and cycloaliphatic, such as alkyl, for example, methyl, ethyl, propyl, butyl, hexyl, heptyl, octyl; haloalkyl, such as trfluoropropyl, fluorobutyl; cycloalkyl, such as cyclobutyl, cyclohexyl. Radicals included by R" are for example, vinyl, allyl, propenyl, 1-, 2- or 3-butenyl, ethynyl, propargly, cyclohexenyl, etc. Radicals included by Y, are for example, halogen such as chloro, bromo, fluoro; acyloxy such as formoxy, acetoxy, propionoxy, butyroxy, etc.; ketoximato, such as methylaldoximato, dimethylketoximato, ethylbutylketoximato, etc.; amino such as methylamino, ethylamino, isopropylamino, dimethylamino, isobutylamino, etc. In the above formulae, where R, R', R" and Q respectively, can represent more than one radical, these radicals can be all the same, or any two or more of the aforementioned radicals.

One method of making the unsaturated polyester is by effecting reaction between an aliphatically unsaturated compound of the formula, (3)             R″Q′ and polyester consisting essentially of chemically combined units of Formula 1, where R″ is as previously defined, Q′ is a radical selected from

and

and X is a halogen radical, such as chloro, bromo, fluoro, etc.

Preferably, the unsaturated polyester is made by contacting polyester with a polyisocyanate having the formula,

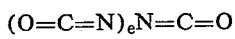

where W and e are as previously defined. The resulting isocyanate terminated polyester can be further reacted with an aliphatically unsaturated organic compound of the formula, (4)             R″ZH where R″ and Z are as prevously defined.

Polyesters which can be utilized in the practice of the present invention to provide for the production of the unsaturated polyester are well known and can include commercially available materials. Such polyesters can have terminal hydroxy radicals which serve as reactive sites when contact is effected with materials such as shown by Formula 3 or polyisocyanates.

The polyesters which can be utilized in the practice of the invention can be linear or branched. They can be produced by effecting reaction between a polycarboxylic acid and a polyglycol. Some of the polycarboxylic acids, which can be employed in making the polyesters are oxalic acid, malonic acid, succinic acid, glutaric acid, adipic acid, palmitic acid, suberic acid, azelaic acid, sebacic acid, phthallic acid, isophthallic acid, terephthallic acid, halogenated phthallic acid, etc. Glycols which can be employed to make the polyesters utilized in the practice of the invention include 1,4-butanediol, 1,4-cyclohexanedicarbinol, ethylene glycol, diethylene glycol, triethylene glycol, etc.; propylene glycol, 1,3-butylene glycol, 1,4-butylene glycol, isomers of dihydroxybenzene, bis-phenols, such as diphenylolpropane, halogenated bis-phenols, etc. Mixtures of glycols and triols, such as glycerine, 1,2,6-hexanetriol, trimethylolpropane, pentaerythritol, etc., also can be employed in combination with any one or more of the aforementioned acids. The polyesters also can be made from minor amounts of materials such as butadienemonoxide to provide for the presence of aliphatic unsaturation along the chain. This can provide for an improved degree of crosslinking, if desired. Esterification and transesterification methods for making these polyesters are well known. A method which can be employed for example, is described on pages 45–48 of "Polyurethanes Chemistry and Technology," J. H. Saunders and K. C. Fritch, Interscience Publishers, New York (1962).

Silicon hydrides included by Formula 2 are for example, acyloxysilane such as

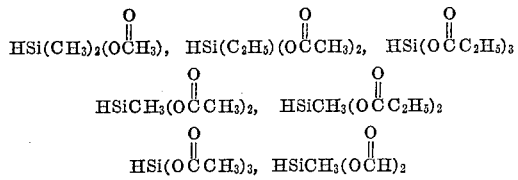

etc.; ketoximatosilanes such as,

HSiCH₃[ONC(CH₃)(C₂H₅)]₂
HSi(CH₃)₂[ONC(CH₃)(C₂H₅)]
HSi₁ONC(CH₃)(C₂H₅)]₃, HSiCH₃[ONC(CH₃)₂]₃ etc.; halosilanes, such as

HSiCl₃, HSi(CH₃)₂Cl, HSi(CH₃)F₂, HSi(CH₃)Cl₂
HSi(CH₃)Br₂ etc. In addition to the aforementioned silicon hydrides, there is also included by Formula 2, aminosilanes which can be made by effecting reaction between polyester having terminal halosilylorgano radicals, and amines such as ammonia, primary amines such as methylamine, ethylamine, isopropylamine and secondary amines such as dimethylamine, ethylisobutylamine, methylisopropylamine, etc.

Aliphatically unsaturated compounds included by Formula 3 are for example,

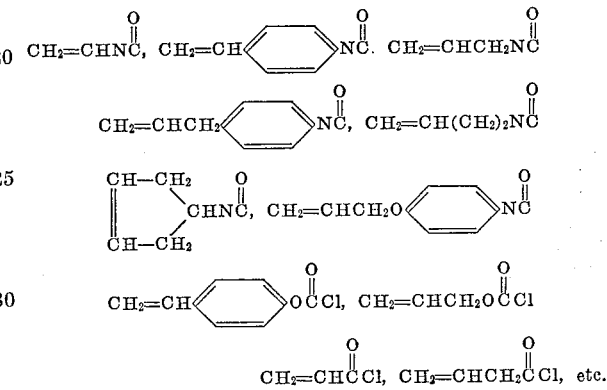

Polyisocyanates which can be employed in the practice of the invention are for example,

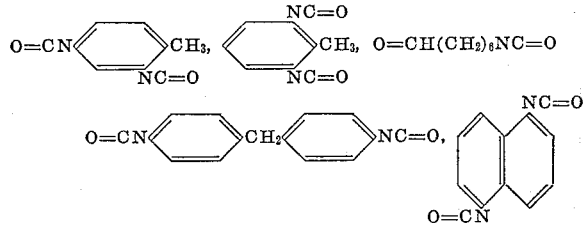

Aliphatically unsaturated organic compounds included by Formula 4, are for example, allyl alcohol, allyl mercaptan, allylamine, p-allylphenol, p-aminostyrene, etc.

The polyester having organosilyl groups, which can provide for the curable compositions of the invention, are made by a stepwise procedure. Reaction can be initially effected between a polyester and an aliphatically unsaturated compound of Formula 3, which can be in the form of an isocyanate, an acid halide or a haloformate. This procedure can provide for the direct production of polyester having terminal aliphatic unsaturation. In instances where an acid halide or haloformate is employed, an acid acceptor can be used. Thereafter, addition of silicon hydride of Formula 2 to the aliphatically unsaturated polyester can be effected.

When reaction is effected between a polyisocyanate and a polyester, aliphatic unsaturation can be introduced by effecting contact between the isocyanate terminated polyester and aliphatically unsaturated organic compound of Formula 4. In order to provide for optimum results, when employing the polyisocyanate with the polyester in this manner, the polyester should have a molecular weight in the range of between about 500 to 10,000. There should be utilized from about 10 parts to 50 parts of polyisocyanate, per 100 parts of polyester. The production of polyester having chemically combined organosilyl groups can be effected by the addition of a silicon hydride of Formula 3 to the aliphatically unsaturated polyester in the presence of platinum catalyst. The addition is preferably accomplished in the presence of a platinum catalyst, for example, in the form of a platinum-olefin complex as shown in my Patent 3,159,601, or in the form of a chloroplatinic acid-alcoholate as shown in Lamoreaux Patent 3,220,972 which are both assigned to the same assignee as the present invention.

Experience has shown that the curable compositions of the present invention can remain stable for at least 6 months or more at a temperature in the range of between 0° C. to 100° C., if there are present no more than 100 parts of water per million of composition. Well known procedures can be employed to minimize the presence of water in the final composition. For example, the ingredients such as polyester can be dried by azeotroping out water by use of toluene, etc. Mixing of the ingredients can be performed under an inert gas atmosphere such as nitrogen, etc.

The curable compositions of the present invention can contain curing accelerators, such as stannous octoate, dibutyltindilaurate, stannous oleate, which can be utilized in amounts of about 0.001 percent to 10.0 percent, by weight of composition. Fillers also can be utilized in proportions up to about 50 parts of filler, per 100 parts of composition. For example, filler such as carbon black, diatomaceous earth, fumed silica, etc., can be employed. Reinforcing materials, such as silicon carbide whiskers, glass fibers, etc., can be utilized. In addition, pigments, heat stabilizers, plasticizers also can be employed.

The curable compositions of the present invention can be utilized in sealing and caulking applications, in roof construction, as an encapsulating and potting compound, etc.

In order that those skilled in the art will be better able to practice the present invention, the following examples are given by way of illustration and not by way of limitation. All parts are by weight.

Example 1

There was added under substantially anhydrous conditions, 32.8 parts of allyl isocyanate to 400 parts of polyester dissolved in toluene. The polyester was a reaction product of adipic acid and diethylene glycol and had a molecular weight of about 2020. The resulting mixture was heated for 5 hours at 100°C. There was added 0.008 part of platinum to the mixture in the form of chloroplatinic acid. The mixture was heated to 55° C., and 32.4 parts of diacetoxy-methylsilane was added all at once. The mixture was then heated to 100°C. for 3 hours. The solvent was removed by flash evaporation. A tack-free product was obtained in less than two hours by pouring the mixture into an aluminum dish and exposing it to atmospheric conditions. After 3 days, a cured sheet was obtained. A slab cut from the sheet showed a tensile of 133 (p.s.i.) and an elongation of 16 (percent).

Example 2

A mixture of 200 parts of polyester, prepared from 1,3-butyleneglycol and adipic acid, and 11 parts of alkyl isocyanate, was heated at 100° C. for 4 hours. There was added to the mixture while under a nitrogen atmosphere, 0.004 part of platinum as utilized in Example 1, followed by 21.5 parts of diacetoxymethylsilane. The mixture was then stripped to 115° C. at 4 mm. There was then added, 0.10 part of dibutyltindilaurate and the product was poured onto a tin plate. It was allowed to cure under atmospheric conditions. It showed a tack-free time of less than 2 hours. After 6 days, a cured sheet was obtained having valuable elastomeric and insulating properties.

Example 3

A polyester having a molecular weight of about 2,000 was made by reacting adipic acid and diethylene glycol. There was added under substantially anhydrous conditions, 430 parts of 2,4-toluenediisocyanate to 2500 parts of the polyester in a toluene solution at a temperature of about 100° C. The mixture was heated until infrared showed it was free of hydroxyl radicals. There was then added to the mixture, 0.4 part of dibutyltindilaurate and 145 parts of allyl alcohol. When an infrared spectrum of a sample of the mixture showed it was free of isocyanate, 0.05 part of platinum-ethylene complex, and 400 parts of methyldiacetoxysilane was added at a temperature between 100° C. to 105° C. An additional hour was required at 100° C., until infrared showed that the mixture was free of silicon hydride. There was then added 0.04 part of stannous octoate per 100 parts of polymer. The solvent was removed by flash evaporation.

A new blend was made of 10 parts of fumed silica, per 100 parts of the above polyester. Another blend was made containing 20 parts of fumed silica, per 100 parts of polymer. The blends were poured onto a flat aluminum sheet and exposed to the atmosphere. In less than 2 hours time, the surface of the resulting products were tack-free. After 8 days, cured slabs were obtained which showed valuable insulating and elastometric properties.

Example 4

The procedure of Example 3 was repeated, except that 10 parts of carbon-black was blended with 100 parts of the polyster having terminal diacetoxymethylsilylurethane groups. The resulting cured product showed a tensile of 439 (p.s.i.), and elongation of 404 (percent) and a hardness (Shore A) of about 23.

Example 5

There was added 40.4 parts of allyl alcohol and 0.06 part of dibutyltindilaurate to 200 parts of a reaction product of 2,4-toluenediisocyanate and a polyester of 12-hydroxy-9-octadecenoic acid. The mixture was heated until the infrared spectrum of a sample of the mixture showed the absence of isocyanate. There was then added, 112.8 parts of methyldiacetoxysilane, 0.04 part of platinum as chloroplatinic acid, and 0.10 part of stannous octoate. The solvent was removed by flash evaporation. The mixture was poured onto a smooth metal surface and exposed to the atmosphere. In less than 2 hours the surface of the mixture was tack-free. After 8 days a slab was cut from the resulting cured sheet; its physicals were measured. The physicals of the cured product were gain measured after 18 days, and after 25 days. The table below shows the results obtained after 8 days, 18 days and 25 days, where T is tensile (p.s.i.) and E is elongation (percent).

TABLE

| Days | T | E |
| --- | --- | --- |
| 8 | 738 | 65 |
| 18 | 1,360 | 140 |
| 25 | 2,512 | 173 |

Example 6

A polyester having terminal diacetoxymethylsilylurethane groups is prepared by the procedure of Example 3. It was blended with 30 parts of fumed silica filler, per 100 parts of polyester. Another polyester-filler blend was made by utilizing 30 parts of carbon black having an average particle size of 22 millimicrons, a surface area of 120 square meters per gram and a pH of about 4.5. Slabs were cut from sheets of the cured compositions which were obtained by allowing the compositions to cure under atmospheric conditions for 3 days. The slabs were found to exhibit swell ratios which were superior to the swell ratios obtained from similar filled, heat-cured polydimethylsiloxanes.

Example 7

There was added under substantially anhydrous conditions, 110 parts of allyl isocyanate to 1300 parts of a poly (1,2-propyleneglycoladipate) which had a molecular weight of about 2,000. The polyester had been dried previously by azeotroping it with toluene. The mixture was stirred at a temperature between 90° C. to 110° C. until it was free of isocyanate, as determined by its infrared spectrum. There was then added, 0.08 part of platinum in the form of chloroplatinic acid, followed by 214.5 parts of methyldiacetoxysilane. The addition was performed at a temperatue between 100° C. to 110° C. There was added to 145 parts of the resulting mixture, 0.05 part of stannous octoate. The solvent was removed by flash evaporation. The mixture was then poured onto a tin plate and exposed to the atmosphere. In less than 1 hour at a temperature of 25° C., the mixture was tack-free. A slab was cut from the resulting cured sheet after it had remained exposed to the atmosphere for about 5 days. The slab showed valuable elastomeric and insulating properties.

Example 8

There was added, 230 parts of 2,4-toluenediisocyanate, to 1300 parts of the poly(1,2-propyleneglycoladipate) of Example 8, at a temperature between 90° C.–100° C. There were also added to the resulting product, 0.18 part of dibutyltindilaurate, and 76.7 parts of allyl alcohol. The mixture was heated at about 100° C. until it was free of isocyanate as determined by its infrared spectrum. There was then added to the resulting mixture 0.08 part of a platinum catalyst in the form of a platinum-ethylene complex, followed by 214.5 parts of methyldiacetoxysilane. The temperature of the mixture was maintained at 100° C. until it was free of silicon hydride, as determined by infrared.

There was added, 0.04 part of stannous octoate to 265 parts of the above product. The solvent was removed by flash evaporation. A portion of the above product was then poured onto a tin plate and allowed to cure under atmospheric conditions. It was found to be tack-free in less than 1 hour. After 5 days, a slab was cut from the cured sheet which had formed; it showed a tensile of 218 (p.s.i.), an elongation of 139 (percent), a tear of 25.9 (p.i) and a hardness (Shore A) of 40.

Example 9

A polyester having a molecular weight of 2020 is made by effecting reaction between adipic acid and diethylene glycol in accordance with standard esterification procedures. Water is removed from the polyester by azeotroping it with toluene. A mixture is made consisting of 200 parts of a polyester, 150 parts of toluene, and 15.7 parts of dry pyridine. The mixture is cooled to −20° C. in a Dry Ice-acetone bath. There is then slowly added to the mixture 23.9 parts of allylchloroformate. After stirring the mixture for 4 hours at −20° C., it is allowed to warm to room temperature. The mixture is then filtered and the solvent is removed from the resulting filtrate by flash evaporation. The residue is dissolved in chloroform and washed with distilled water. The chloroform solution is then dried and the chloroform is removed by flash evaporation. There is obtained 206 parts of residue.

The residue is dissolved in 150 parts of toluene. There is added to the resulting solution, 0.01 part of a platinum-ethylene complex. The mixture is warmed to 90° C. There is then added 30.5 parts of methyldiacetoxysilane while the temperature of the mixture is maintained at 90° C. to 105° C. by external cooling. The mixture is then heated for an additional hour after the addition and cooled to room temperature. There is added to the mixture, 0.2 part of stannous octoate. The mixture is then stripped of toluene, and the residue is poured onto a tin plate. After the mixture is exposed under atmospheric conditions for about three days, a solid polymer is obtained having valuable elastomeric and insulating properties.

Example 10

A substantially anhydrous mixture is made consisting of 200 parts of the polyester of Example 9, 150 parts of toluene, and 15.7 parts of dry pyridine. It is cooled to 20° C., utilizing a Dry Ice-acetone bath. There is slowly added to the mixture with stirring, 20.7 parts of butanoylchloride. Stirring is continued at 20° C. for 4 hours, after the addition has been completed. After the mixture has been allowed to warm to room temperature, it is filtered. The filtrate is stripped of toluene, the residue is dissolved in chloroform and washed with water. There is obtained 202 parts of residue, after the chloroform solution is dried and the chloroform removed under reduced pressure. There is added to a toluene solution of the residue, 0.01 part of platinum-ethylene complex. The mixture is then warmed to 90° C. and 30.5 parts of methyldiacetoxysilane is slowly added. The temperature of the reaction is maintained between 90° C. to 115° C. by external cooling. The mixture is then allowed to cool to room temperature and 0.2 part of stannous octoate is added. A viscous residue is obtained after the toluene is removed by vacuum-stripping. The residue is allowed to cure under atmospheric conditions for 3 days on a tin plate. A tack-free sheet is obtained having valuable elastomeric and insulating properties.

Based on the above results, those skilled in the art would know that the room temperature curable compositions provided by the present invention have relatively short tack-free time, compared to other room temperature vulcanizing compositions. In addition, the curable compositions of the invention exhibit superior resistance to oil swell as compared to heat-cured organopolysiloxane compositions.

The foregoing examples have of necessity been limited to only a few of the very many variables within the scope of the present invention. It should be understood that the present invention is directed to a much broader class of curable compositions comprising polyester consisting essentially of chemically combined units of Formula 1 having organosilyl groups consisting of at least one monovalent silyl radical joined by a carbon-silicon linkage to the polyester through an intermediate polyvalent organic radical such as a member selected from

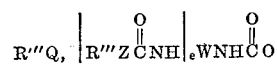

etc., where R''' is a divalent organo radical selected from hydrocarbon radicals and halogenated hydrocarbon radicals, and Q, Z, W, and e are as previously defined. The polyester having the aforesaid chemically combined organosilyl radicals can be made by effecting contact between a silicon hydride of Formula 2 and an unsaturated polyester consisting essentially of chemically combined units of Formula 1. The aforementioned unsaturated polyester can be made by effecting reaction between a polyester and an unsaturated compound of Formula 3 or a polyisocyanate followed by the employment of an aliphatically unsaturated organic compound of Formula 4. The addition of the silicon hydride to the aliphatically unsaturated polyester is effected in the presence of a platinum catalyst. It is also understood that the present invention is directed to a method for making the curable compositions of the present invention involving the use of a variety of conditions included in the foregoing description, as well as materials which can be utilized in combination with the polyester having silylorgano groups.

What I claim as new and desire to secure by Letters Patent of the United States is:

1. Room temperature curable compositions comprising a liquid polyester free of aliphatic unsaturation having a molecular weight between about 500 to 10,000 inclusive and chemically combined silylorgano groups, which have attached to silicon at least one radical selected from the class consisting of acyloxy radicals, amino radicals, halogen radicals, and ketoximato radicals.

2. A room temperature curable composition, in accordance with claim 1, containing a filler.

3. A room temperature curable composition in accordance with claim 1, comprising polyester consisting essentially of chemically combined units of the formula, $$-RO\overset{O}{\overset{\|}{C}}R\overset{O}{\overset{\|}{C}}O-$$

having organosilyl groups consisting of (A) at least one monovalent silyl radical of the formula, $$Y_{3-a}\overset{R'_a}{\underset{|}{Si}}-$$

joined by a carbon-silicon bond to (B) an intermediate polyvalent organo radical selected from the class consisting of hydrocarbon radicals, halogenated hydrocarbon radicals, hydrocarbonoxy radicals and halogenated hydrocarbonoxy radicals, where R is selected from the class consisting of saturated divalent hydrocarbon radicals and halogenated saturated divalent hydrocarbon radicals, R' is selected from the class consisting of monovalent hydrocarbon radicals and halogenated monovalent hydrocarbon radicals, Y is a hydrolyzable radical selected from the class consisting of acyloxy radicals, amino radicals, halogen radicals and ketoximato radicals, and $a$ is a whole number equal to 0 to 2, inclusive.

4. A room temperature curable composition in accordance with claim 1, comprising polyester consisting essentially of chemically combined units of the formula, $$-RO\overset{O}{\overset{\|}{C}}R\overset{O}{\overset{\|}{C}}O-$$

having terminal monovalent silyl radicals of the formula, $$Y_{3-a}\overset{R'_a}{\underset{|}{Si}}-$$

attached by a carbon-silicon bond to a polyvalent organo radical of the formula, $$\left|R'''Z\overset{O}{\overset{\|}{C}}NH\right|_e W N \overset{O}{\overset{\|}{C}} O$$

where R is selected from the class consisting of saturated divalent hydrocarbon radicals and halogenated saturated divalent hydrocarbon radicals, R' is selected from the class consisting of a monovalent hydrocarbon radicals and halogenated monovalent hydrocarbon radicals, Y is a hydrolyzable radical selected from the class consisting of acyloxy radicals, amino radicals, halogen radicals and ketoximato radicals, R''' is selected from the class consisting of divalent hydrocarbon radicals, and halogenated divalent hydrocarbon radicals, Z is a member selected from the class consisting of NG, O and S, G is a member selected from the class consisting of hydrogen, and R', W is a polyvalent hydrocarbon radical, $a$ is a whole number equal to 0 to 2, inclusive, and $e$ has a value equal to 1 or 2 and 1 less than the valence of W.

5. A room temperature curable composition in accordance with claim 1, comprising polyester consisting essentially of chemically combined units of the formula, $$-RO\overset{O}{\overset{\|}{C}}R\overset{O}{\overset{\|}{C}}O-$$

having terminal monovalent silyl radicals of the formula, $$Y_{3-a}\overset{R'_a}{\underset{|}{Si}}-$$

attached by carbon-silicon bonds to a divalent organo radical of the formula,

R'''Q where R is selected from the class consisting of saturated divalent hydrocarbon radicals and halogenated saturated divalent hydrocarbon radicals, R' is a member selected from the class consisting of monovalent hydrocarbon radical and halogenated monovalent hydrocarbon radicals, R''' is selected from the class consisting of divalent hydrocarbon radicals and halogenated divalent hydrocarbon radicals, Y is a hydrolyzable radical selected from the class consiting of acyloxy radicals, amino radicals, halogen radicals and ketoximato radicals, Q is a linkage selected from the class consisting of ester, carbonate, and urethane, and $a$ is a whole number equal to 0 to 2, inclusive.

6. A room temperature curable composition in accordance with claim 1, where said organosilyl groups consist of a silicon atom having hydrolyzable radicals attached thereto, joined by carbon-silicon bonds to a radical of the formula, $$-C_3H_6O\overset{O}{\overset{\|}{C}}HN-\underset{H_3C}{\underset{\phantom{X}}{\bigcirc}}-NH\overset{O}{\overset{\|}{C}}O$$

7. A curable composition in accordance with claim 1, comprising a polyester of the average formula, $$\left[\overset{O}{\overset{\|}{C}}(CH_2)_4\overset{O}{\overset{\|}{C}}OC_2H_4O\right]_{10}$$

having terminal groups of the formula, $$(CH_3\overset{O}{\overset{\|}{C}}O)_3SiC_3H_6O\overset{O}{\overset{\|}{C}}HN-\underset{H_3C}{\underset{\phantom{X}}{\bigcirc}}-NH\overset{O}{\overset{\|}{C}}O$$

8. A composition in accordance with claim 1, where said organosilyl groups consist of a silicon atom having hydrolyzable radicals attached thereto, joined by carbon-silicon bonds to a radical of the formula, $$-C_3H_6NH\overset{O}{\overset{\|}{C}}O$$

9. A curable composition in accordance with claim 1, comprising polyester having organosilyl groups with acetoxy radicals attached to silicon.

10. A curable composition in accordance with claim 1, containing fumed silica.

11. A curable composition in accordance with claim 1, containing carbon black.

12. A method for making pourable room temperature vulcanizing compositions which comprises effecting under liquid phase reaction conditions in the substantial absence of moisture and in the presence of a platinum catalyst, the addition of a silicon hydride of the formula, $$Y_{3-a}\overset{R'_a}{\underset{|}{Si}}H$$

to a polyester having a molecular weight between about 500 to 10,000 inclusive, which consists essentially of chemically combined units of the formula, $$-RO\overset{O}{\overset{\|}{C}}R\overset{O}{\overset{\|}{C}}O-$$

and aliphatically unsaturated radicals selected from,

R''Q and $$\left|R''Z\overset{O}{\overset{\|}{C}}NH\right|_e W N \overset{O}{\overset{\|}{C}} O$$

where R is selected from the class consisting of saturated divalent hydrocarbon radicals and halogenated saturated divalent hydrocarbon radicals, R' is a member selected from the class consisting of monovalent hydrocarbon radicals and halogenated monovalent hydrocarbon radicals, R'' is a member selected from the class consisting of monovalent unsaturated aliphatic hydrocarbon radicals and halogenated monovalent unsaturated aliphatic hydrocarbon radicals, Q is a linkage selected from the class consisting of ester, carbonate, and urethane, Z is a member selected from the class consisting of NG, O and S, G is a member selected from the class consisting of hydrogen and R', W is a polyvalent hydrocarbon radical, $a$ is a whole number equal to 0 to 2 inclusive, and $e$ has a value equal to 1 or 2 and 1 less from the valence of W.

13. A method in accordance with claim 12, which comprises (1) effecting reaction between a polyester consisting essentially of chemically combined units of the formula,

and a polyisocyanate of the formula, $$(O\!=\!C\!=\!N)_e WN\!=\!C\!=\!O$$

(2) effecting reaction between an aliphatically unsaturated organic compound of the formula, $$R''ZH$$

and the product of (1), and (3) effecting addition between a silicon hydride of the formula,

and the product of (2) in the presence of a platinum catalyst, where R is a member selected from the class consisting of saturated divalent hydrocarbon radicals and halogenated saturated divalent hydrocarbon radicals, R' is a member selected from the class consisting of monovalent hydrocarbon radicals and halogenated monovalent hydrocarbon radicals, R" is selected from the class consisting of monovalent unsaturated aliphatic hydrocarbon radicals and halogenated monovalent unsaturated aliphatic hydrocarbon radicals, W is a polyvalent hydrocarbon radical, Y is a hydrolyzable radical selected from the class consisting of acyloxy radicals, amino radicals, halogen radicals and ketoximato radicals, Z is a member selected from the class consisting of NG, O and S, G is a member selected from the class consisting of hydrogen and R', $a$ is a whole number equal to 0 to 2, inclusive, and $e$ has a value equal to 1 or 2 and 1 less than the valence of W.

14. A method in accordance with claim 12, which comprises (1) effecting reaction between a polyester consisting essentially of chemically combined units of the formula,

and an aliphatically unsaturated compound of the formula, $$R''Q'$$

and (2) effecting reaction between the product of (1) and a silicon hydride of the formula,

in the presence of a platinum catalyst, where R is a member selected from the class consisting of saturated divalent hydrocarbon radicals and halogenated saturated divalent hydrocarbon radicals, R' is a member selected from the class consisting of monovalent hydrocarbon radicals and halogenated monohydrocarbon radicals, R" is selected from the class consisting of monovalent unsaturated aliphatic hydrocarbon radicals and halogenated monovalent unsaturated aliphatic hydrocarbon radicals, Q' is a radical selected from the class consisting of

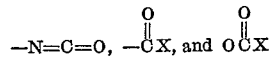

X is a halogen radical, Y is a hydrolyzable radical selected from the class consisting of acyloxy radicals, amino radicals, halogen radicals and ketoximato radicals, and $a$ is a whole number equal to 0 to 2, inclusive.

15. A method in accordance with claim 12, which comprises (1) effecting reaction between a poly(1,2-propyleneglycoladipate) to toluene diisocyanate, (2) effecting reaction between the product of (1) and allyl alcohol, and (3) effecting addition between the product of (2) and methyldiacetoxysilane in the presence of a platinum catalyst.

16. A method in accordance with claim 12, which comprises (1) effecting reaction between a poly(1,2-propyleneglycoladipate) and allyl isocyanate, and (2) effecting reaction between the product of (1), and methyldiacetoxysilane in the presence of a platinum catalyst.

17. A method in accordance with claim 12, which comprises (1) effecting reaction between a poly(1,2-propyleneglycoladipate and allylchloroformate in the presence of an acid acceptor, and (2) recovering from (1) the resulting poly(1,2-propyleneglycoladipate) having terminal allyl carbonate groups, and (3) effecting reaction between the product of (2) and methyldiacetoxysilane in the presence of a platinum catalyst.

18. A method in accordance with claim 12, which comprises (1) effecting reaction between a poly(1,2-propyleneglycoladipate) and 1-butanoylchloride in the presence of an acid acceptor, (2) recovering from (1), the resulting poly(1,2-propyleneglycoladipate) having terminal 1-propane ester linkages, and (3) effecting addition between the product of (2) and methyldiacetoxysilane in the presence of a platinum catalyst.

References Cited

UNITED STATES PATENTS

| | | | |
|---|---|---|---|
| 2,723,987 | 11/1955 | Speier | 260—75 |
| 2,924,588 | 2/1960 | Speier | 260—75 |
| 3,170,891 | 2/1965 | Speier | 260—46.5 |

FOREIGN PATENTS 653,701   3/1965   Belgium.

MORRIS LIEBMAN, *Primary Examiner.*

L. T. JACOBS, *Assistant Examiner.*

U.S. Cl. X.R.

260—75, 37